United States Patent [19]

Blythe

[11] Patent Number: 5,054,056

[45] Date of Patent: Oct. 1, 1991

[54] TAMPER-DETERRENT DEVICE

[75] Inventor: William H. Blythe, Roswell, Ga.

[73] Assignee: Bell South Corporation, Atlanta, Ga.

[21] Appl. No.: 575,208

[22] Filed: Aug. 29, 1990

[51] Int. Cl.⁵ .................... B65G 11/04; H04M 17/02
[52] U.S. Cl. .................................. 379/145; 232/57.5; 194/202
[58] Field of Search ............... 379/143, 145; 232/57.5; 194/202

[56] References Cited

U.S. PATENT DOCUMENTS

4,248,336  2/1981  Fiedler .............................. 194/202
4,966,325 10/1990  Anello ........................... 379/145 X Primary Examiner—Stafford D. Schreyer
Attorney, Agent, or Firm—Jones, Askew and Lunsford

[57] ABSTRACT

The present invention is directed toward deterring modification of a telephone unit by drilling by inserting a drill guard in the drilling path or axis such that the drill guard defines a surface portion in the drill path or axis at a deflection angle sufficient to prevent drilling due to deflection of the drill.

14 Claims, 6 Drawing Sheets

TAMPER-DETERRENT DEVICE

TECHNICAL FIELD

This invention relates in general to tamper-deterrent devices, and particularly to a tamper-deterrent device configured for insertion within a public telephone unit, in order to deter tampering with the same.

BACKGROUND OF THE INVENTION

Public telephone units have been in use for many decades. Typically, such public telephone units accept money, normally in the form of coins, in exchange for local or long-distance telephone service. These public telephone units may be located at a variety of sites, which may or may not be supervised. In the case of unsupervised sites, vandals have been known to modify the telephone units in an effort to circumvent the requirement for coin input in order to receive telephone service, or to remove or otherwise retrieve the coins once they have been accepted in exchange for telephone service. One such modification is the drilling of a hole in the side of a telephone unit, and subsequent insertion of an elongate rod or pin in order to facilitize unauthorized diversion of accepted coins to the coin return slot, when the coins should instead be diverted to a coin bank for later removal by authorized personnel. Obviously, such modification is undesirable to those providing the telephone service, as inadequate compensation is received therefor.

Consequently, it may be seen that a need exists for a means or device for preventing the above-described modification, which is preferably inexpensive to manufacture and install.

SUMMARY OF THE INVENTION

A device embodying the present invention has been developed in order to address the above-discussed modification concerns. Such a device includes a relatively rigid member defining a substantially planar surface portion, with the surface portion being positioned relative to the drilling axis such that the drill tends to be reflected upon encountering the surface portion, and is prevented from piercing the surface portion. Therefore, access to critical parts of the telephone unit is prevented, and unauthorized tampering with the same is prevented.

Thus, it is an object of the present invention to provide an improvement for public telephone units.

It is a further object of the present invention to provide a device which prevents drilling along particular axes.

It is a further object of the present invention to provide a device which prevents drilling of a public telephone unit along particular axes.

It is a further object of the present invention to provide a device which may be easily retrofitted into an existing telephone unit, without substantial labor requirements.

Other objects, features and advantages of the present invention will become apparent from reading the following specification when taken in conjunction with the accompanying drawing.

DETAILED DESCRIPTION OF THE PREFERRED EMBODIMENT

Figure 1:
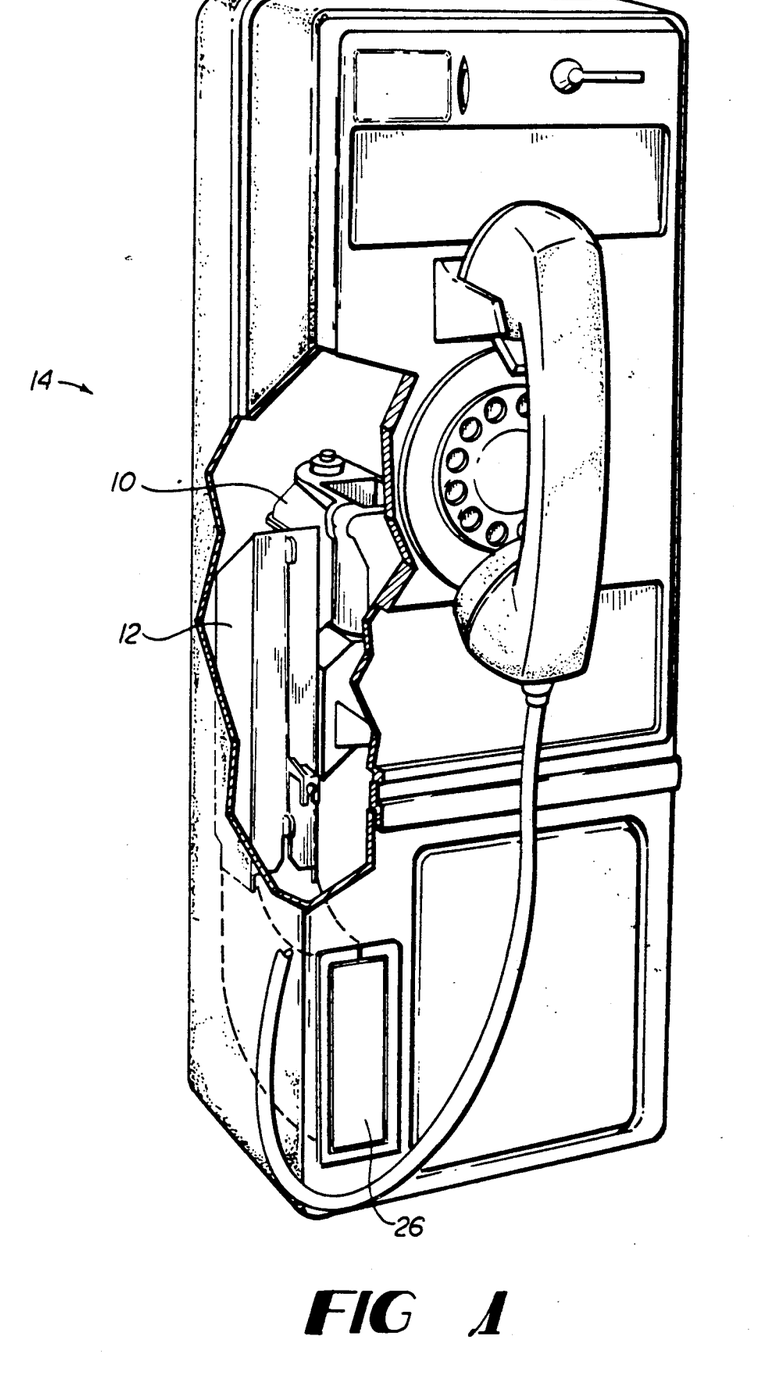
FIG. 1 is an isolated pictorial view of a public telephone unit 14, having a portion of its cover partially cut away for purposes of illustrating interior components.

Referring now in more detail to the drawings, in which like numerals indicate like parts throughout the several views, FIG. 1 illustrates a coin relay and hopper assembly 10 and a coin return chute 12 both in position within a typical public phone unit 14.

Figure 2:
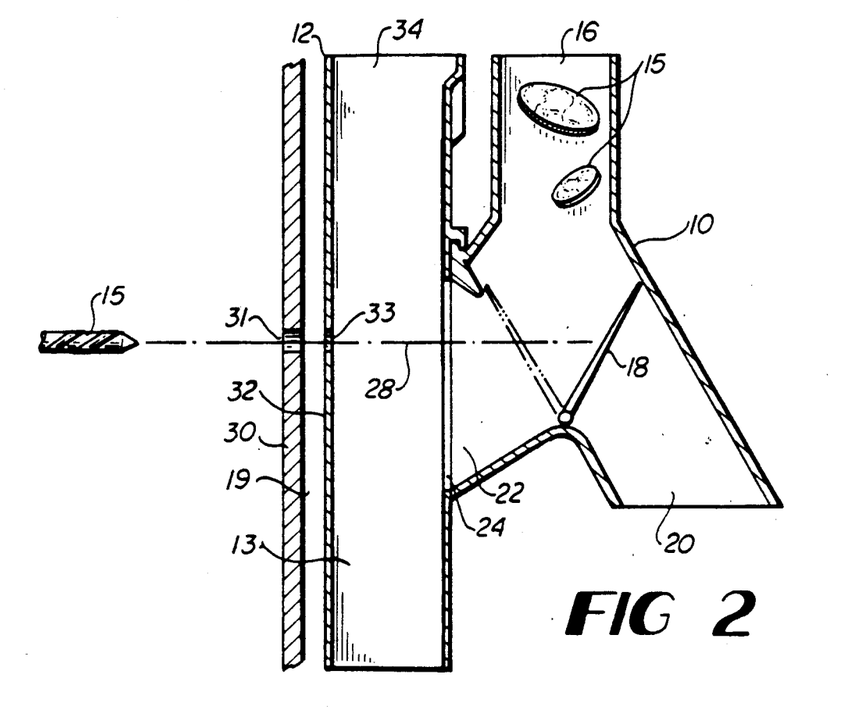
FIG. 2 is a front cross-sectional plan view of a portion of a side wall 30 of the public telephone unit illustrated in FIG. 1, as well as cross-sectional views of internal components of the public telephone unit, namely a coin return chute 12 and a coin relay and hopper assembly 10.

Referring also to FIG. 2, the general configuration and operation of the above-described elements is such tht coins 15 are received into inlet opening 16 of the coin relay and hopper assembly 10, and fall under the influence of gravity towards a flapper 18. The flapper 18 is controlled by means known in the art to either divert coins through outlet opening 20 of the coin relay and hopper assembly 10 to a coin collection receptacle or "bank" (not shown) for removal by authorized telephone service personnel, or alternately to divert the coins through outlet opening 22, which mates with a correspondingly-shaped inlet opening 24 defined by one side of the coin return chute 12. Coins passing from the coin relay and hopper assembly 10 into the coin return chute 12 then pass under the influence of gravity downwardly into the phone unit coin return bin 26, to be thereafter manually removed by the user.

Therefore, it may be seen that, if the flapper 18 may be maintained in the "return" position shown in solid line in FIG. 2, coins entering the coin relay and hopper assembly 10 will eventually fall into the phone unit coin return bin 26. Consequently, vandals have sought to maintain such a position of the flapper 18. The configuration of the overall phone system may be such that the flapper position cannot be known except by visual inspection; instead, control signals such as those known in the art are sent to operate the flapper, and its resulting position is presumed. Therefore, by urging the flapper into its "return" position, vandals may improperly obtain telephone service without making just compensation and often without detection.

The vandalization occurs as follows. A vandal (not shown) drills with a typical high-speed twist drill bit 15 along a drill axis 28, thus piercing the outside wall 30 of the telephone unit 14 at 31. The vandal continues drilling, and eventually drills through the outside or "left" vertical wall 32 of the coin return chute 12 at 33. At this point a thin elongate pin (not shown) may be inserted by the vandal along the drill axis through the holes provided thereon, as well as through openings 22 and 24, and the pin may be used to push and then maintain the flapper 18 to its "return" position. With the pin in place, the vandal may thereafter use the telephone services by inserting coins into the machine, comforted with the knowledge that these same coins will be returned to the coin return bin due to the improper maintained position of the flapper 18. It should be understood that the illustrated axis may not be the only axis drilled along; vandals may drill along parallel but different axes, or may also drill at a non-horizontal angles.

Figure 3:
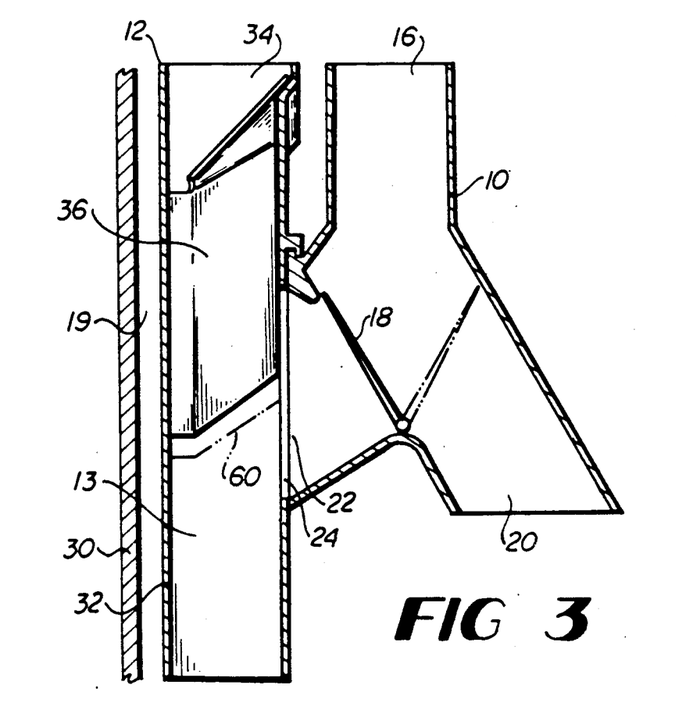
FIG. 3 is a view similar to that of FIG. 2, with the addition of a preferred embodiment of the present invention, namely a drill guard 36.

Also now refer to FIG. 3, which illustrates the desired positioning of a drill guard 36 embodying the present invention. As may be seen, the coin return chute 12 also has an upper inlet opening or port 34, which accepts damaged or unacceptable coins which have been earlier diverted away from the coin relay and hopper assembly 10. The drill guard 36 is inserted through the opening 34 and wedged in position within the throat of the coin return chute 12, as discussed later in further detail. The drill guard 36 is preferably fabricated from stainless steel having a substantially consistent thickness and preferably having a polished, smooth, surface. When in place, one portion of the drill guard 36 may be seen to be intersecting the drill axis 28 at an angle (see FIG. 4) such that when a drill is inserted along the axis, the tip of the drill 15 should be deflected somewhat along the deflecting surface 35 of the drill guard 36. This deflection is preferable, as the drill does not get the chance to "bite" into the stainless steel wall and pass there through. Such deflection results in the vandal being deterred from drilling due to an inability to pierce the drill guard, or by the drill bit being broken.

It should be understood that the present invention is generally directed towards providing an inclined surface in the path of drill access, but the particular configuration of the phone units being retrofitted (in this case model nos. "1C" and "1D" manufactured by Western Electric) dictates that the drill guard 36 be placed within the throat 13 (see FIG. 4) of the coin return chute 12 due to the limitation of space at 19 (See FIGS. 2 and 3) between the outside wall 30 of the telephone unit and the outside vertical wall 32 of the coin return chute 12. However, as may be seen, such positioning is disadvantageous in that a multitude of coins 15 pass into the opening 34 and through the throat 13 of the coin return chute, often in clusters, and coin jamming is of great concern. Therefore, the preferred configuration and positioning of the drill guard has at least partially resulted from this concern.

Figure 7:
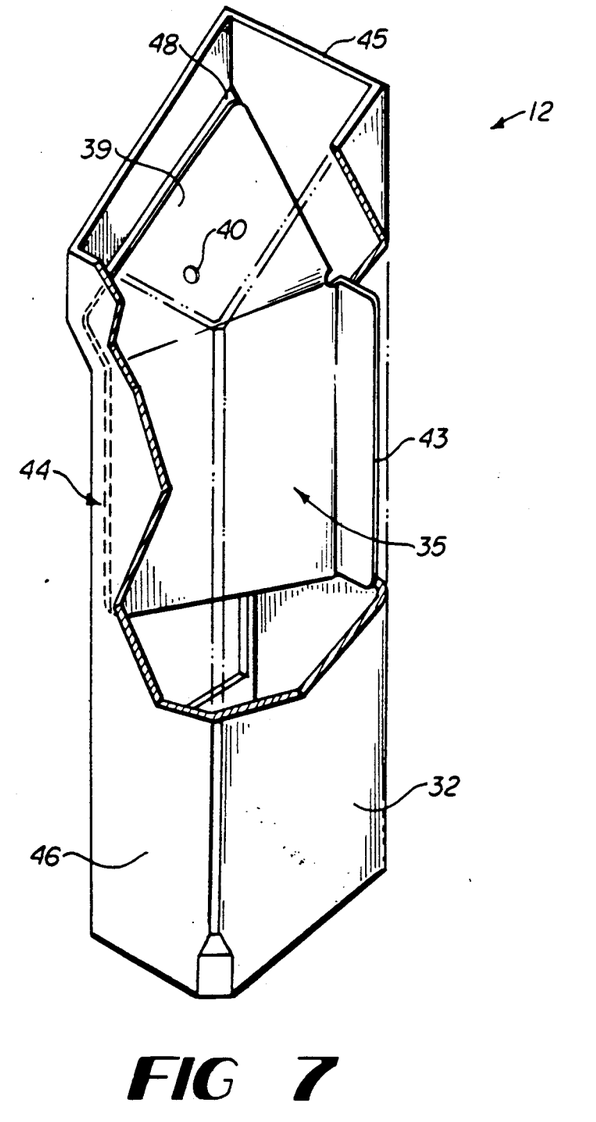
FIG. 7 is an isolated pictorial view of the coin return chute and drill guard combination illustrated in FIGS. 4, 5, and 6, with a portion of the coin return chute 12 cut away for purposes of illustrating the drill guard 39. In this view, exterior surfaces of the rear vertical wall 46 and left vertical wall 32 of the coin return chute 12 are in view, while the exterior surfaces of the front vertical wall and left side vertical wall are not in view.
Figure 8:
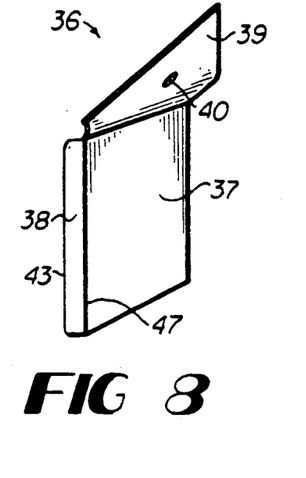
FIG. 8 is an isolated view of the drill guard 36, with the view being similar to that one might view the component within the telephone unit (if properly cut away), if one was viewing the front of the unit with the illustrated component being at approximately eye level.
Figure 9:
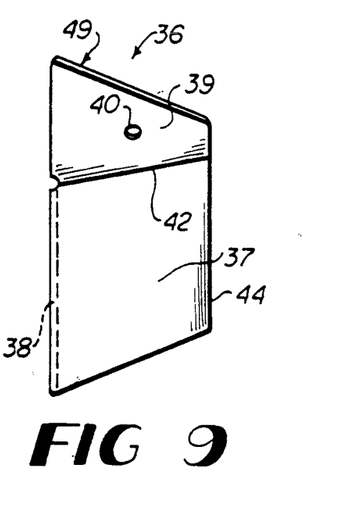
FIG. 9 is an isolated side plan view of the drill guard 36, with the view being similar to that shown in FIG. 6.
Figure 10:
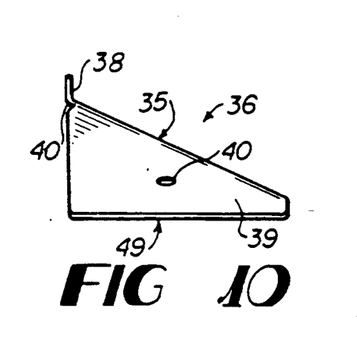
FIG. 10 is an isolated top plan view of the drill guard 36, with the view being that which one might see if standing on the right side of the public telephone unit, and looking downwardly from its top.

Referring to FIGS. 8, 9, and 10, isolated plan views of the drill guard 36 are shown. It should be understood that the drill guard 36 is of one-piece construction, preferably die-cut and stamped from a sheet of stainless steel, although other configurations are contemplated under the present invention. The drill guard 36 includes a main deflecting wall 37 defining a deflecting surface 35 (See FIGS. 4, 7, and 10), a spacer flap 38, and a positioning flap 39, itself defining a drill guard removing hole 40. The deflecting wall 37 joins spacing flap 38 along bend line 41. Positioning flap 39 is joined to deflecting wall 37 along bend line 42.

The drill guard removal hole 40 in the positioning flap 39 is provided in order that a tool (not shown) having a hook configuration at one end may be used in order to grasp and remove the drill guard 36 upwardly and outwardly relative to the coin return chute.

Referring now to FIGS. 4–10, the positioning of the drill guard 36 within the coin return chute 12 is described. The coin return chute 12 is of two-piece construction, but may alternatively be of the piece construction. Furthermore, the coin return chute 12 may be composed out of metals known in the art, or plastics known in the art. The throat 13 of coin return chute is somewhat wider at its upper end, although it steps down not far from its upper end, resulting in the majority of the throat having a substantially constant transverse cross section. As described above, many coins pass through this throat and any restrictions within the throat, such as the drill guard, warrant close review.

Figure 4:
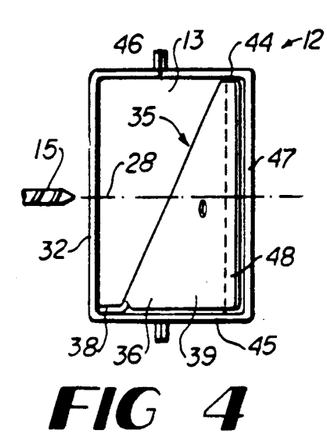
FIG. 4 is an isolated top plan view of a coin return chute 12, with a drill guard 36 positioned therein. This view is how one might view such items within the public telephone unit (if properly cut away), if one was standing in front of the public telephone unit and looking downwardly from above the unit.
Figure 5:
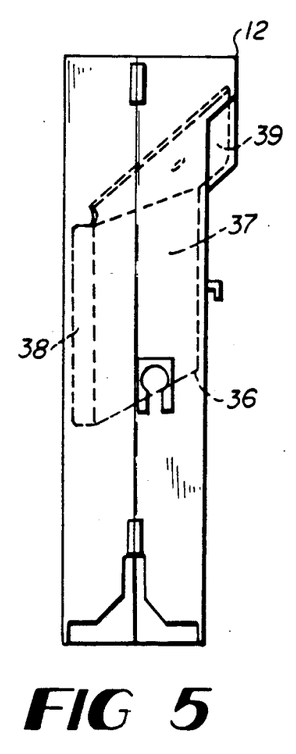
FIG. 5 is an isolated side plan view of the coin return chute 12, with the drill guard 36 positioned therein and illustrated in dotted line. The manner in which this view is illustrated is as one might see the component within the public telephone unit (if properly cut away), if one was facing the front of the public telephone unit with the illustrated components being at approximately eye level.

Referring to FIG. 4, it may seen that the drill guard 36 is inserted into place within the coin return chute 12, such that the positioning flap 39 of the drill guard 36 is preferably in planar contact with, or is closely adjacent to, the interior surface of the front wall 45 of the coin return chute 12, and the longest free edge 43 (see FIGS. 7 and 8) of the spacing flap 38 is lodged into the interior corner defined by the juncture of the outside or "left" vertical wall 32 and the front vertical wall 45 of the coin return chute 12. The deflecting wall 37 is positioned within the coin return chute 12 such that its longest free edge 44 (see FIGS. 4, 7, and 9) is preferably lodged in the interior corner defined by rear vertical wall 46 and inside or "right" vertical wall 47 of the coin return chute 12.

When the coin return chute 12 is in its desired position, it should be understood it provides a substantially vertical throat path for coins to fall therethrough. When the coin return chute 12 is in such a vertical position, the deflecting surface 35 of the deflecting wall 37 of the drill guard 36 is preferably substantially vertical. likewise, the primary planar surfaces of the spacing flap 38 are substantially vertical.

It should be understood that, if the drill guard 36 did not include the positioning flap 39, the drill deflecting characteristics would be present, but coins could become lodged between the deflecting wall 37 of the drill guard 36, and the interior wall 47 and the front wall 45 of the coin return chute. Although such a configuration is contemplated under the present invention, it is not the present preferred configuration. Furthermore, if the positioning flap 39 did not exist, it could be possible for the drill guard 36 to be improperly positioned along the length of the coin return chute. It may be understood, therefore, that the positioning flap 39 serves at least two functions; diversion of coins from a "jam" area, and accurate preferred positioning of the drill guard 36 within the coin return chute 12.

As discussed above, the throat of the coin return chute as defined by its side walls is wider at its upper inlet, but "steps down" at its upper end, therefore defining a inclined ledge 48 (See FIG. 7) within the coin return chute 12 which is inclined downwardly "right" to "left", as viewing the telephone unit from the front, and is also inclined downwardly "front" to "back". When the drill guard 36 is manually inserted into place, it eventually is urged into the throat 13 of the coin return chute 12 until a portion of the positioning flap adjacent free edge 49 (see also FIGS. 9 and 10) encounters the inclined ledge 48 of the coin return chute 12. Subsequently, the drill guard 36 is preferably manually urged a short distance further to "snug" the drill guard 36 into its desired final position with the above-described positioning flap portion being preferably in planar contact with the ledge 48. When in place, it may be seen that the positioning flap 39, as it is inclined toward the remaining throat of the coin return chute 12, tends to guide the coins into the remaining portion of the throat 13 of the coin return chute 12.

As described above, due to the nature of the public telephone unit 14 being retrofitted by insertion of the drill guard 36, many constraints were encountered, not least space constraints at 19 (See FIGS. 2 and 3). It was desired to provide a deflecting surface at the most severe angle possible relative to the drill axis in order to encourage deflection, but, at the same time, the more steep the angle, the more space taken along the drill axis and consequently more restriction of the throat of the coin return chute. In reference to FIG. 11, explanation is provided.

Figure 11:
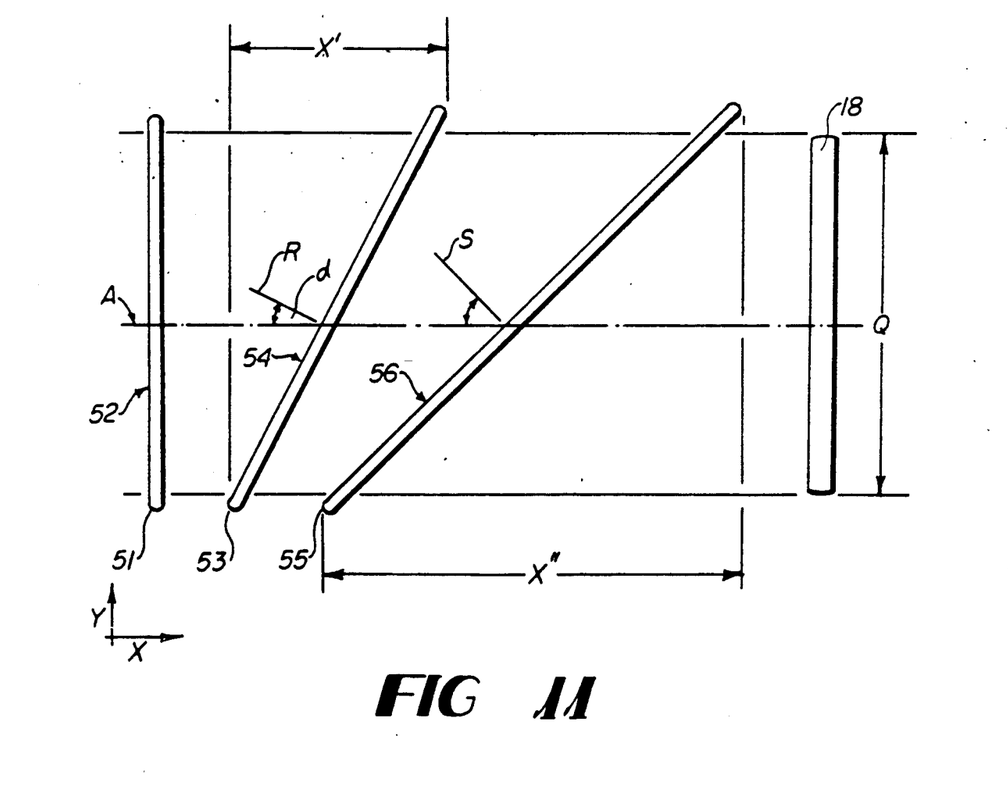
FIG. 11 is an illustrative drawing, illustrating various orientations of various members intersecting a zone Q.

FIG. 11, an illustrative drawing, illustrates a typical flapper 18, which, as described above, is vulnerable to deflection from unauthorized pins inserted through holes drilled along drill axes. A typical axis A may be one of these axes. As may be seen by the illustrative view, drilling along axis A will provide access to the flapper 18, but it may also be seen that there is a typical drilling zone Q which may also be used by the vandal, which likewise must be obstructed, such as by a deflecting wall as described above.

Referring to element 51, it may be seen that this element traverses the zone Q, but the normal axis of its deflecting surface 52 is substantially parallel to the drill axis A. For purposes of this application, a "deflection angle" is now defined for purposes of this description, with the deflection angle being the angle between: a) the drilling axis, and b) the normal axis of the deflecting surface portion which intersects the drilling axis. With respect to element 51, the deflecting axis may be seen to be approximately zero.

As discussed above, drilling through such members at such orientations (such as the outside wall of the telephone units) is relatively easy. Therefore, the present invention contemplates introduction of deflection angles of greater than zero, such as that exhibited by deflection member 53, which has a deflection angle "d" between axis A and normal axis R of approximately 15 degrees. It may be noted that such a deflection angle is approximately exhibited by the preferred embodiment of the present invention illustrated in FIG. 4, although it is important to note that the present invention is not restricted to such an angle, which may be more or less. For example, a higher deflection angle contemplated by the present invention is exhibited by illustrative deflection member 55.

As may be understood, as one increases the deflection angle, deflection is more readily obtained. However, referring to the "x" and "y" coordinates illustrated in FIG. 11, as one increases the deflection angle from that exhibited by member 53 to member 55, the length of deflection plate required to cover zone Q increases, and furthermore, the distance along the "x" coordinates occupied by the deflection plates increases from X' to X". As discussed above, space limitations are very often encountered in configurations such as the above-described public telephone units. For this reason, it is difficult to provide a deflecting surfaces having a high deflection angle due to space limitations. Therefore, compromises have been made, resulting in the preferred embodiment shown above.

ALTERNATE PREFERRED EMBODIMENTS

Figure 6:
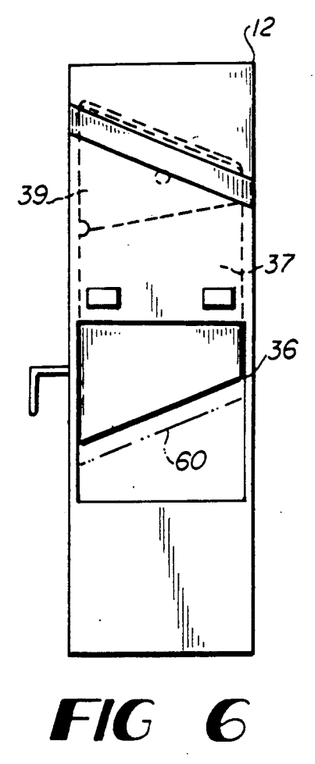
FIG. 6 is an isolated plan view of the coin return chute 12, with the drill guard 36 positioned therein, with dotted lines illustrating the concealed portion of the drill guard as concealed by the coin return chute 12. A bottom portion of the drill guard 36 is not concealed in this view, which is the view which one might view the components within the public telephone unit (if properly cut away), if one was facing the right side of the public telephone unit with the illustrated components at approximately eye level.

It should be understood that, should it be deemed necessary, the length of the drill guard may be increased up to approximately ¼" to that approximately shown in phantom as 60 in FIGS. 3 and 6. It should be understood that such a lenghtening advantageously places further restrictions on access to the flapper, as the deflecting wall extends further down, but disadvantageously the passage of coins from the coin relay and hopper assembly 10 is also more restricted, as the coins must pass beneath the lower edge of the drill guard in order to pass into and fall downwardly through the coin return chute.

Figure 12:
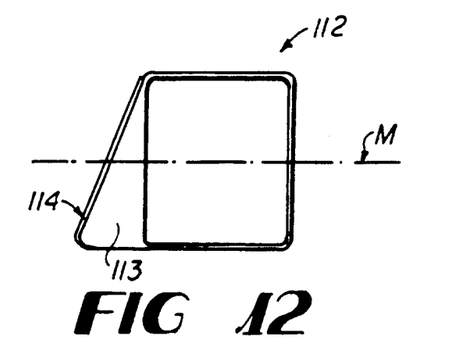
FIGS. 12, 13, and 14 are various top plan views of alternative preferred embodiments of the present invention, and are explained in further detail later in this application.

As discussed above, many space restrictions were encountered in developing the present preferred embodiment described above. However, should such space restrictions not be present, other preferred embodiments may be utilized. In reference to FIG. 12, a alternative preferred embodiment of a coin return chute 112 is illustrated, including a built up region 113, which may or may not include a hardened surface portion 114. As a drill is translated along drill axis "N" to encounter the built up portion 113, it may be seen that as the surface portion of built up region 113, which may be covered by hardened surface portion 114, is encountered by the drill bit, the drill bit will be deflected as described above. It should be understood that, should space be provided for such a built up region 113, such a built up region would be preferable, as such a configuration would oviate the need for a drill guard being positioned within the throat of the coin return chute.

Figure 13:
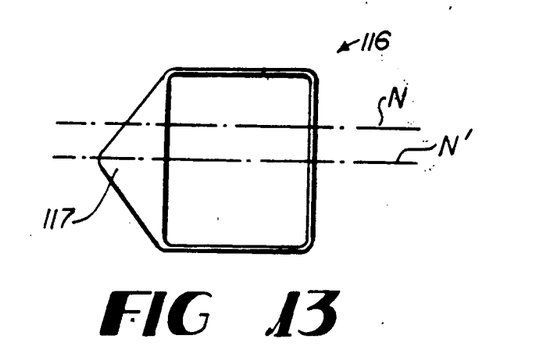

With reference to FIG. 13, it may be seen that another preferred embodiment coin return chute, in transverse cross section, is illustrated. The coin return chute 116 may include a hardened surface portion 117, which could facilitate deflection of a drill, as described above, attempting to be translated along either of axes N or N'. It should be understood that, should a drill be translated along drill axis N', there is a remote possibility that a flat portion could be encountered, thus enabling the drill to pierce the coin return chute 116 along drill axis N'. However, preferably this would be a remote possibility, and vandals would be discouraged from drilling through a member such as that described as 116.

Figure 14:
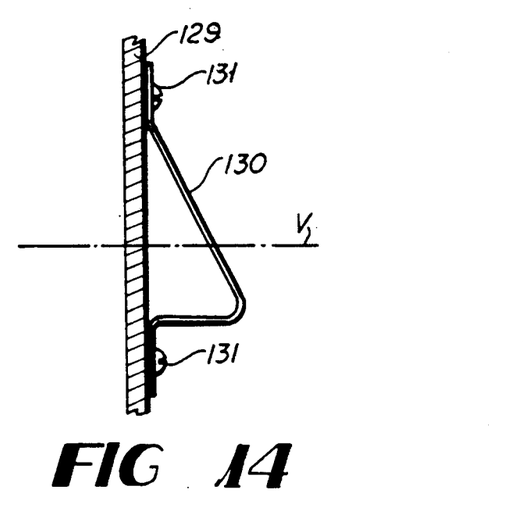

Referencing FIG. 14, a drill guard 130 is illustrated, being attached by fasteners 131 as known in the art to the inside of a typical wall member 129, and configurted out of a flat plate of stainless steel or other sufficiently hard material. It should be understood that as member 130 includes a wall member defining surface portions at an angle relative to drill axis V, that drilling along drill axis V from either direction should be deterred. It should be understood that configurations such as that shown in FIG. 14 are contemplated within the present invention, with such configurations possibly being used if space limitations allow.

CONCLUSION

Therefore, it may be seen that the present invention is an effective and relatively cost- and labor-efficient means for preventing the above-referenced tampering with public telephone units by drilling while at the same time providing minimal disruption to the operation of the telephone units.

It should be understood that different types of materials may be substituted for materials used in the preferred embodiment without departing from the invention. Furthermore, other configurations are contemplated. Accordingly, the scope of this invention is to be limited only by the claims below.

What is claimed is:

1. A device for restricting a drilling process along a drill axis, said device comprising a deflecting member defining a deflecting surface portion intersecting said drill axis at a drill deflection angle sufficient to cause the leading point of said drill to be deflected along said surface portion and not to pass through said surface portion.

2. The device as claimed in claim 1, wherein said deflecting surface portion is substantially planar.

3. The device as claimed in claim 2, wherein said deflecting member is fabricated from stainless steel.

4. The device as claimed in claim 3, wherein said deflecting member is fabricated from a sheet of stainless steel.

5. The device as claimed in claim 3, wherein said surface portion is polished.

6. The device as claimed in claim 1, wherein said deflecting member is fabricated from stainless steel.

7. The device as claimed in claim 6, wherein said surface portion is polished.

8. A device for restricting a drilling process along a drill axis into a telephone unit in order to gain access to and deflect a flapper therein, said drill axis intersecting a coin return chute positioned within said telephone unit, said device comprising a deflecting member positioned within the throat of said coin return chute and defining a deflecting surface portion intersecting said drill axis at a drill deflection angle sufficient to cause the leading point of said drill to be deflected along said surface portion and not to pass through said surface portion.

9. The device as claimed in claim 8, wherein said deflecting surface portion is substantially planar.

10. The device as claimed in claim 9, wherein said deflecting member is fabricated from stainless steel.

11. The device as claimed in claim 10, wherein said deflecting member is fabricated from a sheet of stainless steel.

12. The device as claimed in claim 11, wherein said surface portion is polished.

13. The device as claimed in claim 8, wherein said deflecting member is fabricated from stainless steel.

14. The device as claimed in claim 13, wherein said surface portion is polished.

* * * * *